(12) United States Patent
Huang et al.

(10) Patent No.: US 8,947,333 B2
(45) Date of Patent: *Feb. 3, 2015

(54) SWITCHABLE VIEWING ANGLE DISPLAY WITH LOCAL DIMMING FUNCTION

(75) Inventors: Jiandong Huang, Vancouver, WA (US); Apostolos T. Voutsas, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 863 days.

This patent is subject to a terminal disclaimer.

(21) Appl. No.: 13/173,343

(22) Filed: Jun. 30, 2011

(65) Prior Publication Data

US 2012/0050651 A1    Mar. 1, 2012

Related U.S. Application Data

(63) Continuation-in-part of application No. 13/104,896, filed on May 10, 2011, which is a continuation-in-part of application No. 12/877,017, filed on Sep. 7, 2010, now abandoned, which is a continuation-in-part of application No. 12/873,188, filed on Aug. 31, 2010, now abandoned.

(51) Int. Cl.
G09G 3/36    (2006.01)

(52) U.S. Cl.
USPC .............................. 345/87; 349/33; 349/136

(58) Field of Classification Search
None
See application file for complete search history.

(56) References Cited

U.S. PATENT DOCUMENTS

| 2003/0072080 | A1* | 4/2003 | Ariyoshi et al. | 359/487 |
| 2006/0132423 | A1* | 6/2006 | Travis | 345/102 |
| 2009/0067156 | A1* | 3/2009 | Bonnett et al. | 362/97.2 |

OTHER PUBLICATIONS

Takatoh, K, et al., "New Peeping Prevention Technology to Control Viewing Angle Properties of TFT-LCDs", SID Digest, 2006, pp. 1340-1343.

* cited by examiner

*Primary Examiner* — Seokyun Moon
(74) *Attorney, Agent, or Firm* — Law Office of Gerald Maliszewski; Gerald Maliszewski

(57) ABSTRACT

A switchable viewing angle display method is provided. The method provides a front panel array of display pixels. Also provided is an array of microlenses underlying the array of display pixels. Each microlens has a focal point and each microlens is associated with a corresponding block of display pixels. A backlight panel has an edge-coupled waveguide pipe with an optical input connected to a column of light emitting diodes (LEDs). The backlight panel includes a top array of selectively enabled extraction pixels, a planar mirror underlying the waveguide pipe, and a bottom array of selectively enabled extraction pixels interposed between the waveguide pipe and the planar mirror. In response to accepting a display viewing angle change command, an extraction pixel is enabled from either the top array or the bottom array, and a waveguide pipe light extraction position is formed, changing the viewing angle.

18 Claims, 5 Drawing Sheets

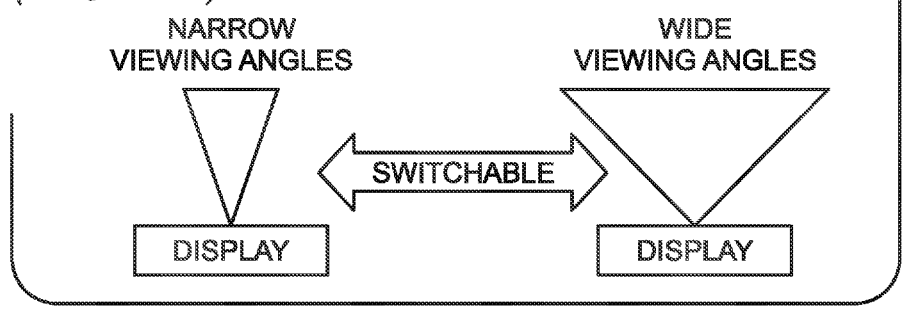
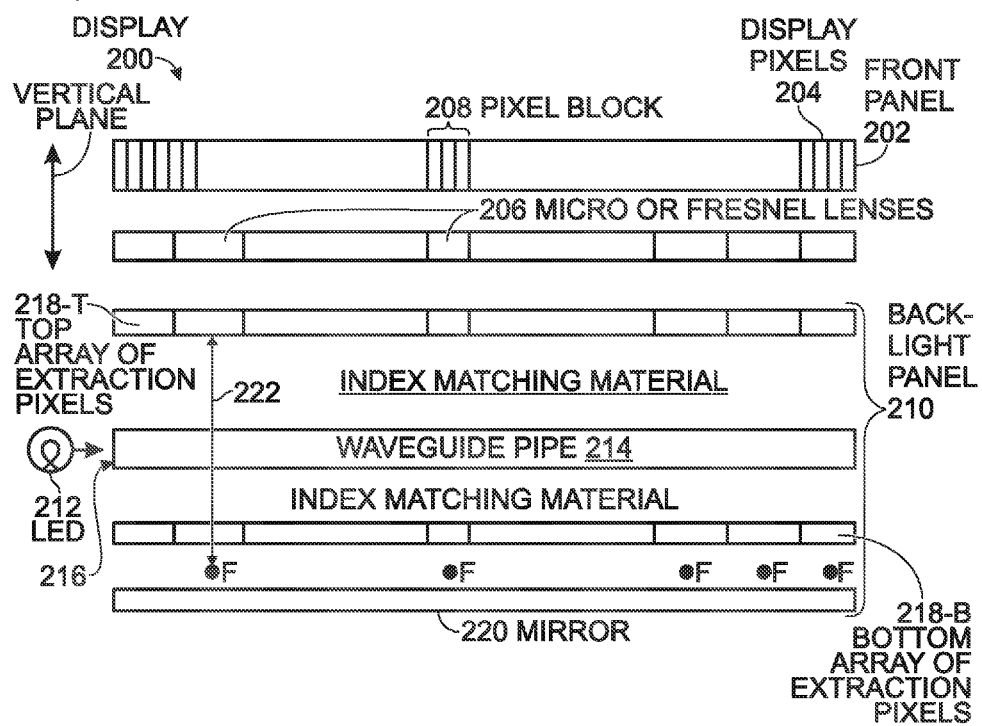

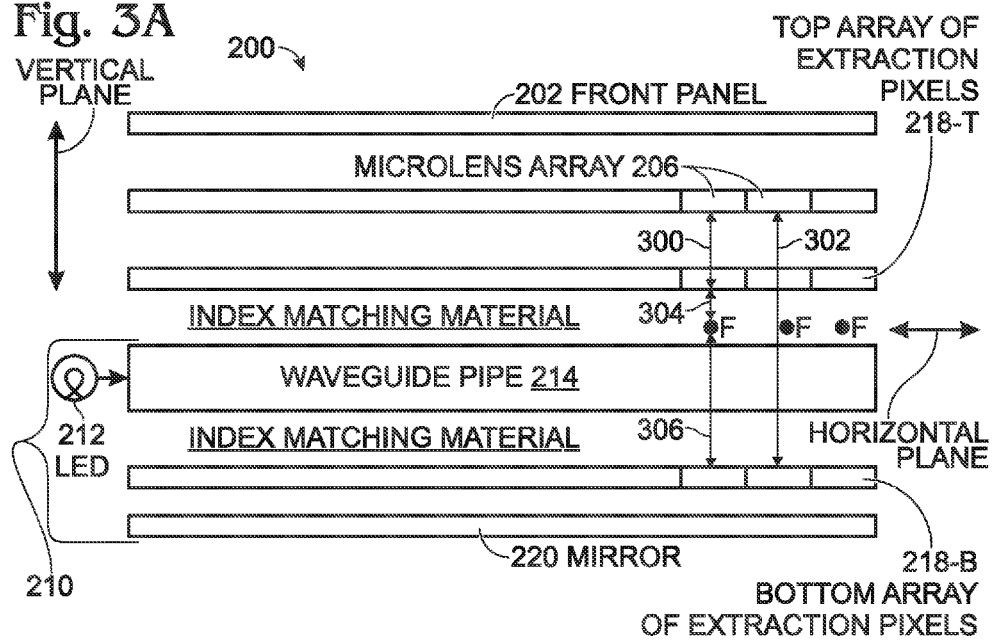
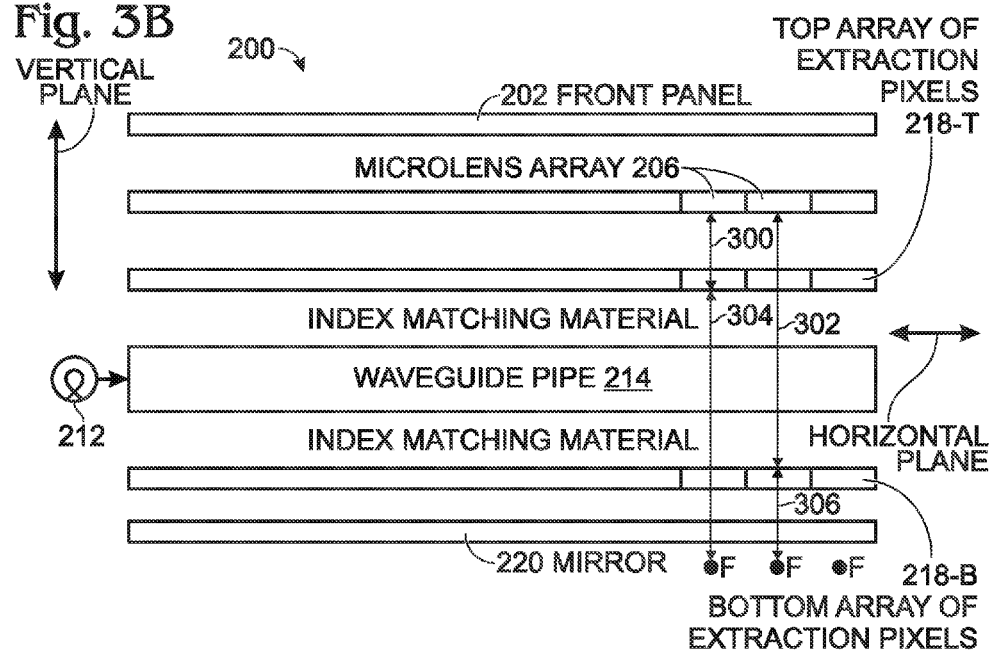

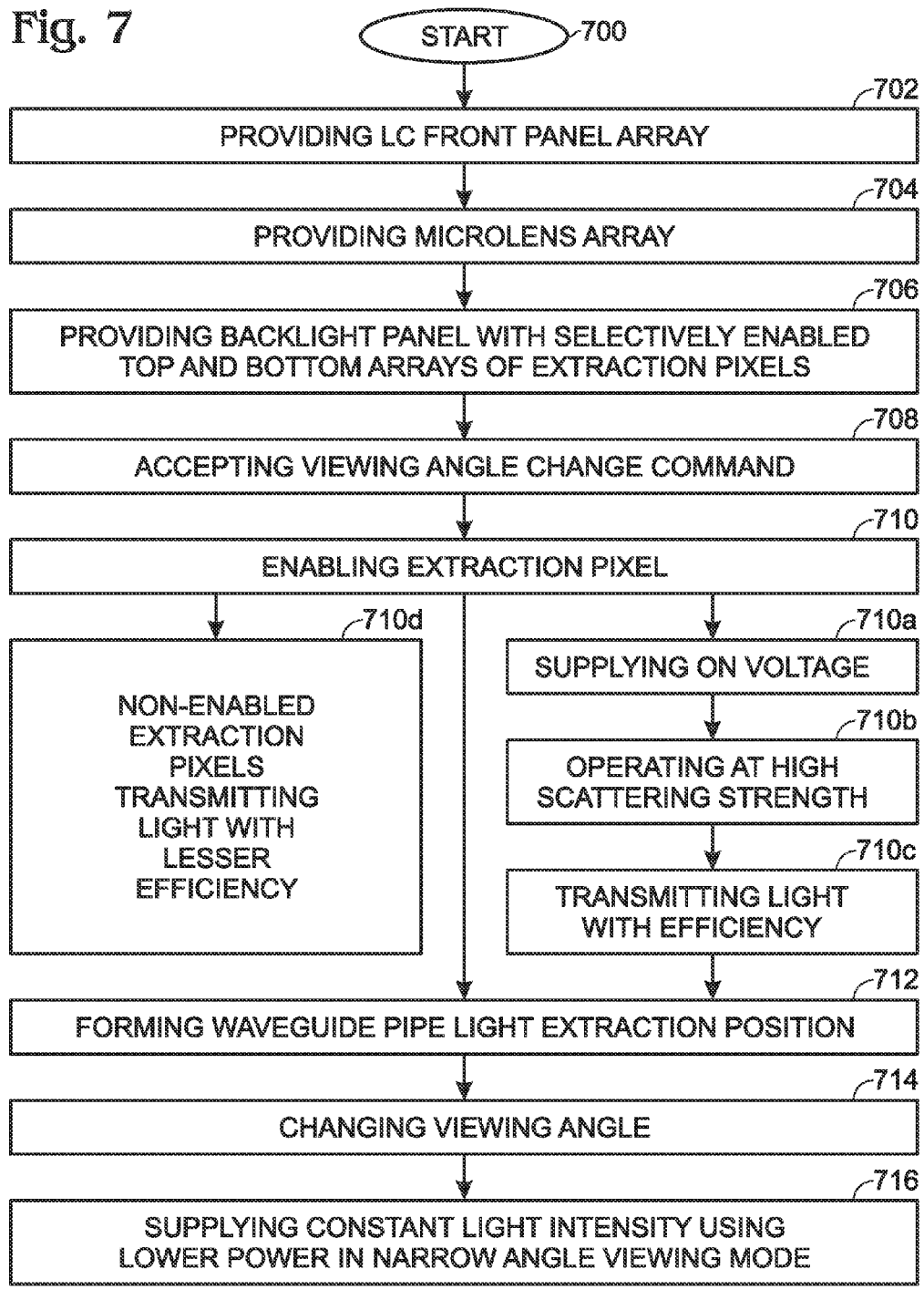

SWITCHABLE VIEWING ANGLE DISPLAY WITH LOCAL DIMMING FUNCTION

RELATED APPLICATION

This application, is a Continuation-in-Part of a pending application entitled, SWITCHABLE VIEWING ANGLE DISPLAY, invented by Huang et al., Ser. No. 13/104,896, filed on May 10, 2011;
which is a Continuation-in-Part of a application entitled, SCATTERING TUNABLE DISPLAY USING REFLECTIVE AND TRANSMISSIVE MODES OF ILLUMINATION, invented by Huang et al., Ser. No. 12/877,017, filed on Sep. 7, 2010, now abandoned;
which is a Continuation-in-Part of a application entitled, THREE-DIMENSIONAL DISPLAY USING ANGULAR PROJECTION BACKLIGHT, invented by Huang et al., Ser. No. 12/873,188, filed on Aug. 31, 2010, now abandoned. All the above-mentioned applications are incorporated, herein by reference.

BACKGROUND OF THE INVENTION

1. Field of the Invention

This invention generally relates to electronic displays and, more particularly, to a display capable of selectively operating in wide and narrow display ranges.

2. Description of the Related Art

Large panel liquid crystal (LC) displays normally require large viewing angles, and designs have been significantly improved to expand the viewing angles to near 180°. However, for portable display devices, more limited viewing angles are often desirable in the interest of privacy. To that end, passive films have been developed that can be used to cover displays, limiting the viewing angles to about 40°. For example, such a film can be used in airline seat displays to limit images that can be seen by neighboring passengers. However, these films degrade the image quality by placing extra film layers over the LC front panel, and such a display has a limited number of applications.

FIG. 1 is a diagram depicting a display with switchable viewing angles (prior art). One such device is presented by Takatoh et al., "New Peeping Prevention Technology to Control Viewing Angle Properties of TFT-LCDs", SID Digest, 2006, pp. 1340). When working in the narrow viewing angle mode, people outside the viewing angle can only see checked black and white blocks, thus protecting privacy. However, this method does not limit the backlight spreading angles, so that light emitted outside the narrow viewing angle is wasted, leading to poor display power efficiencies. The waste of energy is particularly critical for hand-held devices with battery supplied power.

It would be advantageous if a display device viewing angle could be switched by controlling the angle at which the backlight panel of the display supplies light to the front panel.

SUMMARY OF THE INVENTION

Disclosed herein are a display and an illumination method that can switch between viewing angles by controlling the direction of the light supplied by the underlying backlight panel. At narrow viewing angle modes, the display can reduce the backlight intensities while maintaining the same luminance due to narrower angle distributions, which makes the batteries of display devices last longer.

Accordingly, a switchable viewing angle display method is provided, using arrayed microlenses and waveguide pipes with selectable light extraction pixels. A liquid crystal (LC) front panel array of display pixels is provided, arranged in a plurality of sequences, An array of microlenses underlie the array of display pixels. Each microlens has a focal point and each microlens is associated with a corresponding block of display pixels. A backlight panel has an edge-coupled waveguide pipe with an optical input connected to a column of light emitting diodes (LEDs). The backlight panel includes a top array of selectively enabled extraction pixels formed in a plurality of sequences, a planar mirror underlying the waveguide pipe, and a bottom array of selectively enabled extraction pixels interposed between the waveguide pipe and the planar mirror. Each extraction pixel from the top and bottom arrays underlies a corresponding microlens in a vertical plane. In response to accepting a display viewing angle change command, an extraction pixel is enabled from either the top array or the bottom array. In response to selecting the extraction pixel array, a waveguide pipe light extraction position is formed, which is the distance between the enabled extraction pixel and their corresponding microlenses. As a result, the display viewing angle is changed.

More explicitly, each microlens has a focal point in a first horizontal plane. Each extraction pixel in the top array of extraction pixels is a first distance from the focal point of a corresponding microlens. Each extraction pixel in the bottom array of extraction pixels is a second distance from the focal point of a corresponding microlens. Depending upon the microlens design, the second distance can be greater than or less than the first distance.

Additional details of the above-described method, and a switchable viewing angle display using arrayed microlenses and a waveguide pipe with selectable light extraction pixels, are presented below.

BRIEF DESCRIPTION OF THE DRAWINGS

FIG. 1 is a diagram depicting a display with switchable viewing angles (prior art).

FIG. 2 is a schematic block diagram partial cross-sectional view depicting a switchable viewing angle display using arrayed microlenses and a waveguide pipe with selectable light extraction pixels.

FIGS. 3A and 3B are partial cross-sectional views depicting alternative arrangements of the microlens focal points.

FIG. 7 is a flowchart illustrating a switchable viewing angle display method, using arrayed microlenses and waveguide pipes with selectable light extraction pixels.

DETAILED DESCRIPTION

Figure 4A:
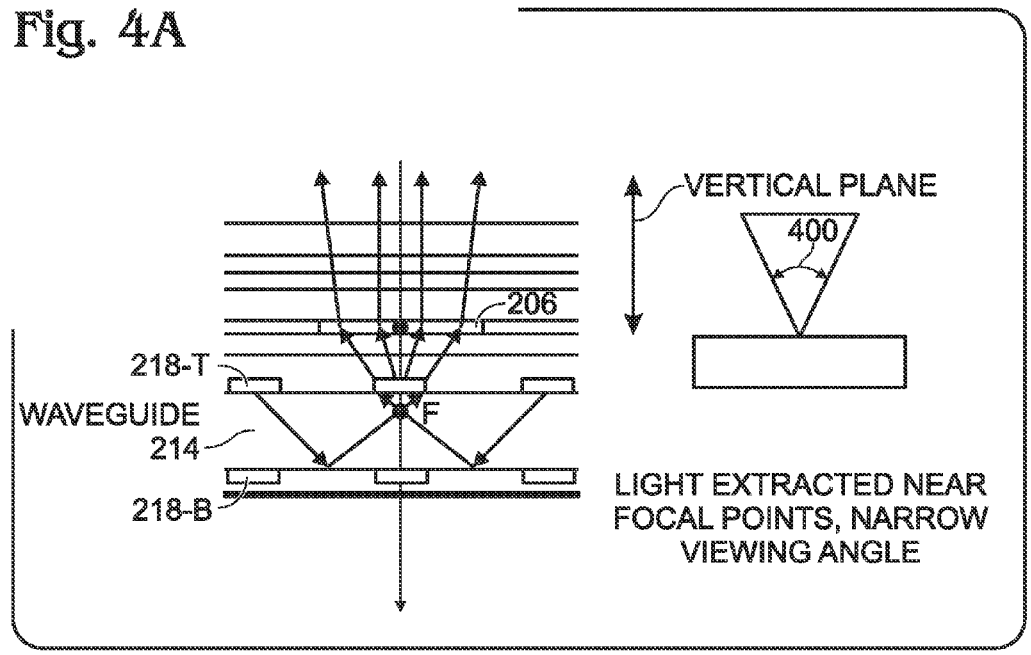
FIGS. 4A and 4B are partial cross-sectional views depicting the above-described display operating with, respectively, and narrow and wide viewing angles.

FIG. 2 is a schematic block diagram partial cross-sectional view depicting a switchable viewing angle display using arrayed microlenses and a waveguide pipe with selectable light extraction pixels. The display 200 comprises a liquid crystal (LC) front panel 202 with an array of display pixels 204 arranged in a plurality of sequences. The display has application to any kind of display pixel requiring a backlight, in cross-section only a single sequence of display pixels 204 can be seen, An array of microlenses 206 underlies the array of display pixels 204, where each microlens 206 has a focal point (F) and each microlens 206 is associated with a corresponding block 208 of display pixels 204.

The backlight panel 210 includes a column of light emitting diodes (LEDs) 212. In cross-section only a single LED can be seen. An edge-coupled waveguide pipe 214 has an optical input 216 connected to the column of LEDs 212. A top array of extraction pixels 218-T is arranged in a plurality of sequences. Each extraction pixel 218-T underlies a corresponding microlens 206 in a vertical plane, and is interposed between the waveguide pipe 214 and the array of microlenses 206. A planar mirror 220 underlies the waveguide pipe 214. A bottom array of selectively enabled extraction pixels 218-B are arranged in a plurality of sequences interposed between the waveguide pipe 214 and the planar mirror 220. Each extraction pixel 218-B in the bottom array underlies a corresponding microlens 206 in the vertical plane. Typically, an index matching material is placed between the waveguide pipe 214 and the top array of extraction pixels 218-T. Likewise, an index matching material is placed between the waveguide pipe and the bottom array of extraction pixels. For example, the refraction index of the index matching material may be value between that of the waveguide pipe material and the extraction pixel materials.

A viewing angle selection switch (not shown) has a wide angle and a narrow angle setting. The switch can be a dedicated button. Alternatively, the viewing angle settings can be activated using a sequence of key strokes on an associated keypad (not shown), or prompted from a display viewing application.

The waveguide pipe's light extraction position is the distance 222 between an enabled extraction pixel 218 and its corresponding microlenses 206, and it changes in response to changing the viewing angle selection switch setting. Shown in this figure is the distance 222 between a microlens 206 and an extraction pixel 218-T in the top array.

In one aspect as shown, the waveguide pipe 214 is a single layer of waveguide pipe, with the top array of extraction pixels 218-T overlying the single layer of waveguide pipe 214, and the bottom array of extraction pixels 218-B underlying the single layer of waveguide pipe 214.

FIGS. 3A and 3B are partial cross-sectional views depicting alternative arrangements of the microlens focal points. Each microlens 206 has a focal point in a horizontal plane. Each extraction pixel 218-T the top array is first distance 304 from the focal point of a corresponding microlens in the vertical plane. Each extraction pixel 218-B in the bottom array is a second distance 306 from the focal point of a corresponding microlens in the vertical plane. The second distance 306 is a measure that can be greater than the first distance 304, as seen in FIG. 3A, or less than the first distance 304, as seen in FIG. 3B.

Figure 4B:
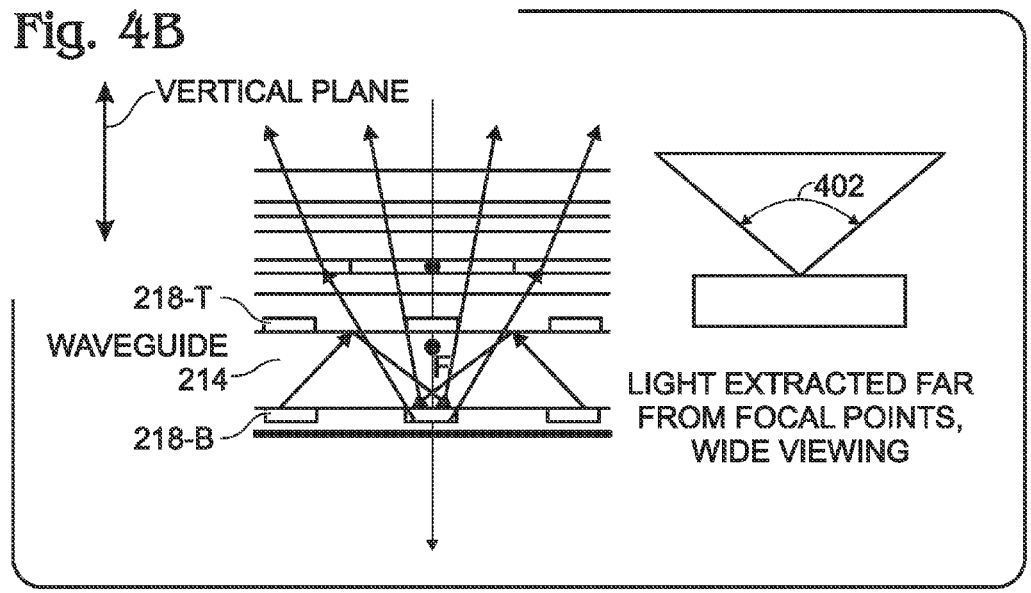

FIGS. 4A and 4B are partial cross-sectional views depicting the above-described display operating with, respectively, and narrow and wide viewing angles. When the viewing angle selection switch is set to the narrow viewing angle, light is distributed through each microlens in a first range of angles 400, and the extraction pixel is enabled in the array having the lesser distance from the corresponding microlens focal point in the vertical plane. As seen in FIG. 4A, extraction pixels 218-T in the top array are closer to the microlens 206 focal point than the bottom array extraction pixels 218-B.

When the viewing angle selection switch is set to the wide viewing angle, light is distributed through each microlens in a second range of angles 402, greater than the first range. The extraction pixel is enabled in the array having the greater distance from the corresponding microlens focal point in the vertical plane. As seen in FIG. 4B, extraction pixels 218-B in the bottom array are further from the microlens 206 focal point that the top array extraction pixels 218-T.

It should be understood that the narrow viewing angle is not always obtained by enabling top array extraction pixels. For example, in FIG. 3B, the narrow viewing angle would be obtained by enabling extraction pixels in the bottom array. Likewise, the wide viewing angle is not always associated with the bottom array extraction pixels. Again using FIG. 3B as an example, the wide viewing angle would be obtained by enabling top array extraction pixels.

Figure 5:
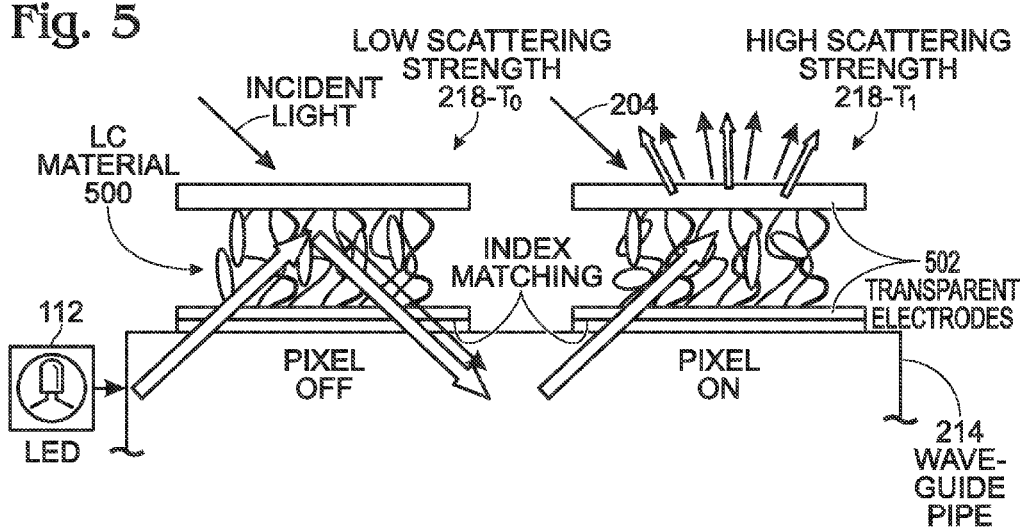
FIG. 5 is a partial cross-sectional view depicting the distinction between enabled and non-enabled exemplary extraction pixels.

FIG. 5 is a partial cross-sectional view depicting the distinction between enabled and non-enabled exemplary extraction pixels. In one aspect, each extraction pixel 218 includes a medium of liquid crystal molecules 500, embedded in a polymer network, and interposed between transparent electrodes 502. Each enabled extraction pixel (e.g., $218-T_1$) medium operates with a high scattering strength in responsive to an ON voltage between the electrodes 502, transmitting light from the waveguide pipe with a first extraction efficiency. Each non-enabled extraction pixel (e.g., $218-T_0$) medium operates with a low scattering strength in responsive to an OFF voltage between the electrodes 502, transmitting light from the waveguide pipe with a second extraction efficiency, less than the first extraction efficiency.

Although only extraction pixels 218-T of the top array are depicted, it should be understood that the extraction pixels of the bottom array (not shown) operate in an equivalent manner. It should also be understood that the extraction pixels may be enabled using other technologies that perform equivalently by gating the passage of light sourced from the waveguide pipe.

Figure 6:
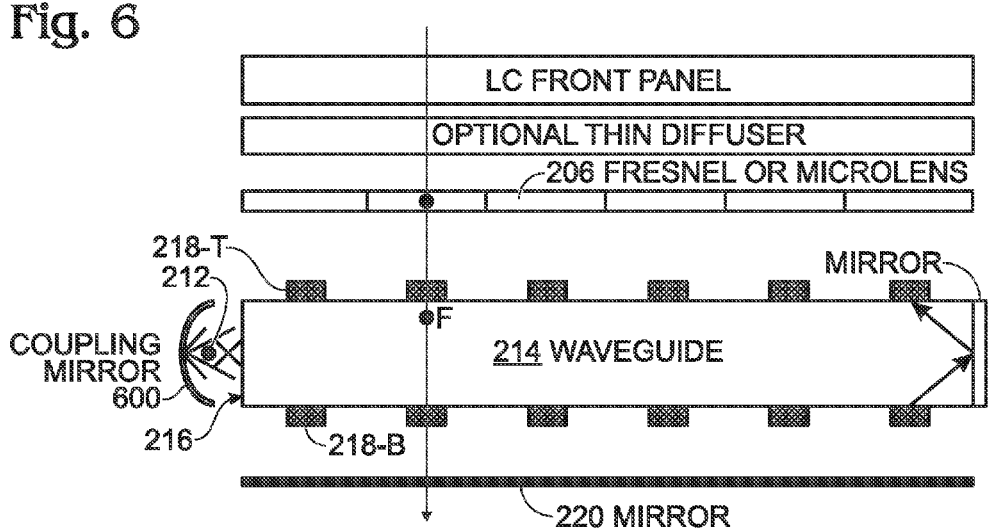
FIG. 6 is a partial cross-sectional view depicting a variation of the display of FIG. 2.

FIG. 6 is a partial cross-sectional view depicting a variation of the display of FIG. 2. In this aspect, the backlight panel includes a mirror 600 with a concave surface (e.g., a parabolic cylindrical mirror) facing the optical input 216 of the waveguide pipe 214. A Fresnel or microlens (with focal points at F) film 206 is placed between a thin diffuser (optional) 602 and the backlight waveguide pipe 214.

Functional Description

FIG. 7 is a flowchart illustrating a switchable viewing angle display method, using arrayed microlenses and waveguide pipes with selectable light extraction pixels. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps are performed in numerical order. The method starts at Step 700.

Step 702 provides a liquid crystal (LC) front panel array of display pixels arranged in a plurality of sequences. Step 704 provides an array of microlenses underlying the array of display pixels, where each microlens has a focal point and each microlens is associated with a corresponding block of display pixels. Step 706 provides a backlight panel with an edge-coupled waveguide pipe having an optical input connected to a column of LEDs. The backlight panel includes a top array of selectively enabled extraction pixels formed in a plurality of sequences, a planar mirror underlying the waveguide pipe, and a bottom array of selectively enabled extraction pixels interposed between the waveguide pipe and the planar mirror. Each extraction pixel from the top and bottom arrays underlies a corresponding microlens in a vertical plane. More explicitly, the waveguide pipe may be a single layer of waveguide pipe, with the top array of extraction pixels overlying the single layer of waveguide pipe, and the bottom array of extraction pixels underlying the single layer of waveguide pipe. In another aspect, providing the backlight panel in Step 706 includes providing a mirror with a concave surface facing the optical input of the waveguide pipe.

Step 708 accepts a display viewing angle change command. Step 710 enables an extraction pixel from either the top or bottom array. In response to selecting the extraction pixel array, Step 712 forms a waveguide pipe light extraction position, which is the distance between the enabled extraction pixel and their corresponding microlenses. Step 714 changes the display viewing angle. Step 716 supplies a constant level of viewed light intensity, regardless of the selected viewing angle, maintained by a first level of supply power using the wide viewing angle. Step 716 supplies a second level of supply power, less than the first level, when the narrow viewing angle is selected.

In one aspect, providing the array of microlenses in Step 704 includes each microlens having a focal point in a first horizontal plane. Providing the top array of extraction pixels in Step 708 includes each extraction pixel in the top array being a first distance from the focal point of a corresponding microlens in the vertical plane. Likewise, each extraction pixel in the bottom array is a second distance from the focal point of a corresponding microlens in the vertical plane. The second distance can be either greater than or less than the first distance.

In another aspect, enabling the extraction pixel in Step 710 includes substeps. Step 710a supplies an ON voltage to the extraction pixel transparent electrodes. In response to the ON voltage, in Step 710b a medium between the electrodes operates at a high scattering strength, In Step 710c the extraction pixel transmits light received from the waveguide pipe with a first extraction efficiency, in Step 710d non-enabled extraction pixels in the same sequence as the enabled extraction pixel transmit light from the waveguide pipe with a second extraction efficiency, less than the first extraction efficiency.

In one aspect, accepting the viewing angle change command in Step 708 includes accepting a narrow viewing angle, where light is distributed through each microlens in a first range of angles. Then, enabling the extraction pixel in Step 710 includes enabling an extraction pixel in the array having the lesser distance from the corresponding microlens focal point in the vertical plane. Alternatively, if Step 708 accepts a wide viewing angle, where light is distributed through each microlens in a second range of angles greater than the first range of angles, then Step 710 enables an extraction pixel in the array having the greater distance from the corresponding microlens focal point in the vertical plane.

In one aspect, Step 710 enables a plurality of extraction pixels in an array, sequentially in time. Then, Step 716 creates a synchronized low-resolution image display by the front LC panel in response to the sequential enablement of extraction pixels. This process realizes a so-called local dimming function.

A selective viewing angle display has been provided. Examples of particular materials and dimensions have been given to illustrate the invention, but the invention is not limited to just these examples. Other variations and embodiments of the invention will occur to those skilled in the art.

We claim:

1. A switchable viewing angle display method, using arrayed microlenses and a waveguide pipe with selectable light extraction pixels, the method comprising:

providing a liquid crystal (LC) front panel array of display pixels arranged in a plurality of sequences;

providing an array of microlenses underlying the array of display pixels, where each microlens has a focal point and each microlens is associated with a corresponding block of display pixels;

providing a backlight panel with a single layer of edge-coupled waveguide pipes, each waveguide pipe having an optical input connected to a light emitting diode (LED), the backlight panel including a top array of selectively enabled extraction pixels formed in a plurality of sequences overlying the waveguide pipe, a planar mirror underlying the waveguide pipe, and a bottom array of selectively enabled extraction pixels interposed between the waveguide pipe and the planar mirror, each extraction pixel from the top and bottom arrays underlying a corresponding microlens in a vertical plane;

accepting a display viewing angle change command;

enabling an extraction pixel selected from a group consisting of the top array and the bottom array in response to supplying an extraction pixel ON voltage;

changing the display viewing angle; and, wherein a distance between an enabled extraction pixel and a corresponding microlens focal point in a narrow viewing angle mode is less than a distance between an enabled extraction pixel and the corresponding microlens focal point in a wide viewing angle mode.

2. The method of claim 1 wherein providing the array of microlenses includes providing each microlens having a focal point in a first horizontal plane;

wherein providing the top array of extraction pixels includes providing each extraction pixel in the top array being disposed at a first distance from the focal point of a corresponding microlens in the vertical plane; and, wherein providing the bottom array of extraction pixels includes providing each extraction pixel in the bottom array being disposed at a second distance from the focal point of a corresponding microlens in the vertical plane, where the second distance is a measure selected from a group consisting of greater than and less than the first distance.

3. The method of claim 1 wherein enabling the extraction pixel includes:

supplying an ON voltage to extraction pixel transparent electrodes;

in response to the ON voltage, operating a medium between the electrodes at a high scattering strength;

the extraction pixel transmitting light received from the waveguide pipe with a first extraction efficiency; and, non-enabled extraction pixels in the same sequence as the enabled extraction pixel transmitting light from the waveguide pipe with a second extraction efficiency, less than the first extraction efficiency.

4. The method of claim 1 wherein providing the top array of extraction pixels includes providing the top array of extraction pixels overlying the single layer of waveguide pipe; and, wherein providing the bottom array of extraction pixels includes providing the bottom array of extraction pixels underlying the single layer of waveguide pipe.

5. The method of claim 4 wherein accepting the viewing angle change command includes accepting a narrow viewing angle command, where light is distributed through each microlens in a first range of angles; and, wherein enabling the extraction pixel in the narrow viewing angle mode includes enabling an extraction pixel in the array disposed at a first distance from the corresponding microlens focal point in the vertical plane.

6. The method of claim 5 wherein accepting the viewing angle change command includes accepting a wide viewing angle command, where light is distributed through each microlens in a second range of angles greater than the first range of angles; and,
wherein enabling the extraction pixel in the wide viewing angle mode includes enabling an extraction pixel in the array disposed at a second distance from the corresponding microlens focal point in the vertical plane, where the second distance is greater than the first distance.

7. The method of claim 1 wherein providing the backlight panel includes providing a mirror with a concave surface facing the optical input of the waveguide pipe.

8. The method of claim 1 further comprising:
supplying a constant level of viewed light intensity, regardless of a selected viewing angle, maintained by a first level of supply power corresponding to a wide viewing angle, and a second level of supply power, less than the first level of supply power, corresponding to a narrow viewing angle.

9. The method of claim 1
further comprising:
creating a synchronized low-resolution image display by the front LC panel in response to the enablement of extraction pixels.

10. A switchable viewing angle display using arrayed microlenses and a waveguide pipe with selectable light extraction pixels, the display comprising:
a liquid crystal (LC) front panel array of display pixels arranged in a plurality of sequences;
an array of microlenses underlying the array of display pixels, where each microlens has a focal point and each microlens is associated with a corresponding block of display pixels;
a backlight panel including:
a column of light emitting diodes (LEDs);
a single layer of edge-coupled waveguide pipes, each waveguide pipe having an optical input connected to a LED;
a top array of selectively enabled extraction pixels arranged in a plurality of sequences interposed between the waveguide pipe and the array of microlenses, each extraction pixel in the top array underlying a corresponding microlens in a vertical plane and enabled in response to an ON voltage;
a planar minor underlying the waveguide pipe;
a bottom array of selectively enabled extraction pixels arranged in a plurality of sequences interposed between the waveguide pipe and the planar mirror, each extraction pixel in the bottom array underling a corresponding microlens in the vertical plane and enabled in response to an ON voltage;
a viewing angle selection switch having a wide angle setting and a narrow angle setting; and,
wherein a distance between an enabled extraction pixel and a corresponding microlens focal point in a narrow viewing angle mode is less than a distance between an enabled extraction pixel and the corresponding microlens focal point in a wide viewing angle mode.

11. The display of claim 10 wherein each microlens has a focal point in a first horizontal plane;
wherein each extraction pixel in the top array is disposed at a first distance from the focal point of a corresponding microlens in the vertical plane; and,
wherein each extraction pixel in the bottom array is disposed at a second distance from the focal point of a corresponding microlens in the vertical plane, where the second distance is a measure selected from a group consisting of greater than and less than the first distance.

12. The display of claim 10 wherein each extraction pixel includes a medium of liquid crystal molecules, embedded in a polymer network, and interposed between transparent electrodes.

13. The display of claim 12 wherein each enabled extraction pixel medium operates with a high scattering strength in responsive to an ON voltage between the electrodes, transmitting light from the waveguide pipe with a first extraction efficiency; and,
wherein each non-enabled extraction pixel medium operates with a low scattering strength in responsive to an OFF voltage between the electrodes, transmitting light from the waveguide pipe with a second extraction efficiency, less than the first extraction efficiency.

14. The display of claim 11 wherein the top array of extraction pixels overlies the single layer of waveguide pipe; and,
wherein the bottom array of extraction pixels underlies the single layer of waveguide pipe.

15. The display of claim 11 wherein the viewing angle selection switch is set to a narrow viewing angle, where light is distributed through each microlens in a first range of angles; and,
wherein the extraction pixel is enabled in the array having the lesser distance from the corresponding microlens focal point in the vertical plane.

16. The display of claim 11 wherein the viewing angle selection switch is set to a wide viewing angle, where light is distributed through each microlens in a second range of angles, greater than the first range; and,
wherein the extraction pixel is enabled in the array having the greater distance from the corresponding microlens focal point in the vertical plane.

17. The display of claim 11 wherein the backlight panel includes a minor with a concave surface facing the optical input of the waveguide pipe.

18. A switchable viewing angle display using arrayed microlenses and a waveguide pipe with selectable light extraction pixels, the display comprising:
a liquid crystal (LC) front panel array of display pixels arranged in a plurality of sequences;
an array of microlenses underlying the array of display pixels, where each microlens has a focal point and each microlens is associated with a corresponding block of display pixels;
a backlight panel including:
a column of light emitting diodes (LEDs);
a single layer of edge-coupled waveguide pipes, each waveguide pipe having an optical input connected to a LED;
a top extraction means arrayed for selectively enabling the extraction of light from the waveguide pipe to the overlying microlenses in response to an ON voltage;
a planar minor underlying the waveguide pipe;
a bottom extraction means arrayed for selectively enabling the extraction of light from the waveguide to the overlying microlenses, via reflection from the underlying planar minor, in response to an ON voltage;
a viewing angle selection switch having a wide angle setting and a narrow angle setting; and,
wherein a distance between an enabled extraction pixel and a corresponding microlens focal point in a narrow viewing angle mode is less than a distance between an enabled extraction pixel and the corresponding microlens focal point in a wide viewing angle mode.

* * * * *